United States Patent
Groeneveld

(10) Patent No.: US 9,131,642 B2
(45) Date of Patent: Sep. 15, 2015

(54) METHOD AND SYSTEM TO CONTROL IRRIGATION ACROSS LARGE GEOGRAPHIC AREAS USING REMOTE SENSING, WEATHER AND FIELD LEVEL DATA

(75) Inventor: David P. Groeneveld, Santa Fe, NM (US)

(73) Assignee: HydroBio, Inc., Santa Fe, NM (US)

( * ) Notice: Subject to any disclaimer, the term of this patent is extended or adjusted under 35 U.S.C. 154(b) by 545 days.

(21) Appl. No.: 13/455,971

(22) Filed: Apr. 25, 2012

(65) Prior Publication Data

US 2012/0290140 A1   Nov. 15, 2012

Related U.S. Application Data

(60) Provisional application No. 61/486,193, filed on May 13, 2011, provisional application No. 61/490,499, filed on May 26, 2011.

(51) Int. Cl.
*G05D 11/00* (2006.01)
*A01G 1/00* (2006.01)
*A01G 25/16* (2006.01)

(52) U.S. Cl.
CPC .............. *A01G 1/001* (2013.01); *A01G 25/16* (2013.01)

(58) Field of Classification Search
USPC ................................ 700/284; 703/11; 455/39
See application file for complete search history.

(56) References Cited

U.S. PATENT DOCUMENTS

| | | | |
|---|---|---|---|
| 6,947,811 B2* | 9/2005 | Addink et al. | 700/284 |
| 2004/0236443 A1* | 11/2004 | Ware et al. | 700/90 |
| 2005/0234691 A1* | 10/2005 | Singh et al. | 703/11 |
| 2006/0161309 A1* | 7/2006 | Moore et al. | 700/284 |
| 2008/0097653 A1* | 4/2008 | Kaprielian et al. | 700/284 |
| 2009/0326723 A1* | 12/2009 | Moore et al. | 700/284 |
| 2013/0104455 A1* | 5/2013 | Groeneveld | 47/58.1 SC |

OTHER PUBLICATIONS

W.M. Baugh & D.P. Groeneveld, "Broadband vegetation index performance evaluated for a low-cover environment"; International Journal of Remote Sensing, vol. 27, Nos. 21-22, pp. 4715-4730, (Nov. 2006); available at http://www.tandf.co.uk/journals.

W.M. Baugh & D.P. Groeneveld, "Correcting satellite data to detect vegetation signal for eco-hydrolic analyses"; Journal of Hydrology vol. 344, Issues 1-2, pp. 135-145, (Sep. 30, 2007); available at http://elsevier.com/locate/jhydrol;.

(Continued)

*Primary Examiner* — Robert Fennema
*Assistant Examiner* — Anthony Whittington
(74) *Attorney, Agent, or Firm* — Bryan Cave LLP

(57) ABSTRACT

A system and method to use remote sensing to estimate crop water use that is forecasted and is updated as weather and new satellite data become available. From these data the system and method uses a water accounting algorithm to prescribe irrigation differentially for regions of a field or for the entire field as an average. Irrigation prescription is delivered remotely through Internet technology.

20 Claims, 6 Drawing Sheets

(56) References Cited

OTHER PUBLICATIONS

W.M. Baugh & D.P. Groeneveld, "Annual groundwater evaporation mapped from single satellite scenes"; Journal of Hydrology vol. 344, Issues 1-2, pp. 146-156, (Sep. 30, 2007); available at www.elsevier.com/locate/jhydrol.

Compton J. Tucker, "Red and Photographic Infrared Linear Combinations for Monitoring Vegetation"; Remote Sensing of Environment 8:127-150, Earth Resources Branch, NASA/Goddard Space Flight Center, Greenbelt, Maryland 20771; Elsevier North Holland Inc. (1979).

* cited by examiner

METHOD AND SYSTEM TO CONTROL IRRIGATION ACROSS LARGE GEOGRAPHIC AREAS USING REMOTE SENSING, WEATHER AND FIELD LEVEL DATA

RELATED APPLICATIONS

This application claims the benefit of U.S. Patent Application Ser. No. 61/486,193, filed May 13, 2011, and U.S. Application No. 61/490,499 filed May 26, 2011. The provisional patent applications listed above are incorporated by reference in their entireties.

BACKGROUND OF THE INVENTION

1. Field of the Invention

The present invention generally relates to the field of precision irrigation for agriculture and more specifically to precision irrigation that is based upon forecasted crop water needs and additional factors.

2. Background

The challenge for modern irrigated agriculture is to provide acceptable yields while conserving water and energy and to perform this conservation at a scale large enough to be meaningful: that is, across large farmed geographic areas. To be an effective solution, a system and method must combine remote sensing data to assess the actual condition of the crop canopy as it relates to its water use and spatially-variable climatic data as it further adjusts the crop's water usage. For irrigation control across regional scales that encompass thousands of square miles, a solution must address at least three types of data necessary to accurately track crop irrigation requirements in time and space: (1) the condition of the crop canopy and how it affects crop water use in a field and the regions within the field that must be known at all times during the growing season for each of potentially thousands of fields across the geographic area; (2) the spatial and temporal variability of reference evapotranspiration (ET) across the geographic area, a mathematical representation of the driving force for ET directly influenced by weather; and (3) rainfall that differentially offsets irrigation requirements and that varies across the geographic area.

Next, for guiding irrigation, three operations must be performed at regular periods for each field and its regions, preferably daily: crop irrigation requirements must be determined; the irrigation prescription must be delivered remotely; and data must be gathered from individual fields for feedback to the irrigation calculations, for example rainfall, reference ET, and successful irrigation.

Systems that adjust irrigation or provide remote irrigation control through the Internet and wireless connectivity are well known in the art. These systems may utilize ET estimation, meteorological, and other data that may be useful in irrigation control but fall short of the large scale that is needed for maximum water conservation. For example, U.S. Pat. No. 5,696,671 "Evapotranspiration Forecasting Irrigation Control System" provides a method and apparatus for using predictive evapotranspiration (ET) and precipitation data in controlling an irrigation system. That system provides for adjusting ET values based upon forecasted weather and using these forecasts to adjust a watering schedule. However, the system fails to describe how ET for the plant cover is determined; it shows only how it is to be adjusted for rain that is received or changes in the atmospheric driving force for ET from that forecasted. That system fails to provide spatial adjustment of the parameters for calculating crop irrigation, both in terms of the sensitivity to crop canopy variability and its influence on water use, or application of reference ET often used as a scalar for the water use of the crop canopy, nor rainfall that offsets each field's irrigation requirement.

U.S. Pat. No. 5,870,302, "Evapotranspiration Remote Irrigation Control System" also discloses a method and system using ET data and monitoring meteorological data used to adjust wet watering schedules based upon meteorologic and ET data. However, the system is not sensitive to variability in the crop canopy and the phenologic timing for crop canopy development that exerts a controlling influence upon crop water use—phenology may vary widely across an agricultural geographic area. Neither does the system specify how to assess the actual water use (ET) of the crop, a necessary step when agricultural crops may be planted and emerge through a two month window, thus influencing large differences in the crop's water use. Neither does the system address the spatial variability of the weather as it affects the crop's water status, nor the remote connectivity necessary for serving the irrigation control of the system and method.

U.S. Pat. No. 6,782,311, "Remotely Controlled Irrigation Timer with Fault Detection", provides irrigation scheduling based on microclimate weather data but simply adjusts automated irrigation schedules served by timer, doing so by neighborhoods rather than continuously varying across agricultural geographic areas encompassing a much larger scale. The adjustment of watering takes place in this system through delaying or expediting watering according to a schedule set in advance; it contains no remote assessment of plant canopy conditions that can be used to assess irrigation needs.

Internet-based methods and apparatus for remotely controlling irrigation systems are exemplified in U.S. Pat. No. 7,587,053 B2 "Universal Remote Terminal, Unit and Method for Tracking the Position of Self-Propelled Irrigation Systems." The method and apparatus provides the machinery for tracking the pivot and controlling the irrigation system that can turn the sprinkler system on and off and can be operated remotely from the field.

The water use of a crop is directly dependent upon the greenness and development of the canopy. Greenness is assessed in the prior art using remote sensing and Earth observation satellite (EOS) data. The condition of the crop canopy assessed using EOS data is used as a scalar against reference ET in the same manner as K factors that are often used for estimating irrigation in agriculture as part of the prior art. K factors are generally derived empirically, published for each crop type, and based upon the assumed growth stage of the crop, rather than on an actual measure of the crop's development.

In the prior art, the dual crop coefficient method is a commonly used standard agricultural method that contains two empirically-derived K factors that partition actual crop water use (designated ETa, herein) into proportions of its water transpired and intercepted by the canopy and that portion evaporated from the soil, that when multiplied by reference ET, provide an estimate of ETa. Reference ET, designated ETr here, is calculated by published and standardized methods to express the evaporation power of the atmosphere acting upon tall-statured crops. This index has units of depth, commonly millimeters or inches per time, often daily. Other published and standardized ET reference indices could similarly work for such calculations in the prior art, for example ETo, commonly used for a short statured crop such as grass. Through calibration, these two indices are interchangeable to derive the same ETa estimate.

$$ETa = ETr \cdot (Kcb + Ke) \qquad \text{Equation 1}$$

Where Kcb is a basal crop coefficient expressing canopy water losses, Ke is a coefficient expressing evaporation of water from the soil surface. ETr is the reference ET applicable for tall-statured crops.

Use of remotely-sensed vegetation indices to express the actual greenness of a crop canopy for the Kcb of Equation 1 is an enhancement of the dual crop coefficient method. Crop greenness is portrayed by vegetation indices that combine red and near infrared light. Crop canopies reflect highly in the near infrared, as do many background surfaces, a common example being dry soils, while the red light is absorbed for photosynthesis. The ratio of red versus near infrared reflectance creates highly useful indices of plant activity that are inversely proportional to the red signal. The normalized difference vegetation index (NDVI; Equation 2) is the most commonly used among these indices.

$$NDVI = \frac{NIR - Red}{NIR + Red} \quad \text{Eqaution 2}$$

Where NIR is the near infrared band and Red is the red band of digital data commonly measured by sensors borne by either aircraft or Earth Observing Satellite (EOS) platforms.

As an estimator of canopy greenness, NDVI accuracy is compromised by complex factors related to soil background and atmospheric aerosol effects that scatter and diffuse light. In combination, these influences attenuate the vegetation signal that NDVI is designed to measure. The accuracy for NDVI to portray hydrologic responses is enhanced by conversion to NDVI* that is calibrated to represent the full range of vegetation greenness from none, given the value zero, to saturated greenness, given the value one. The NDVI* index has been shown in the prior art to out-perform all other commonly used vegetation indices for tracking the hydrologic signal in plants (Baugh and Groeneveld, 2006). Calculation of NDVI* corrects for the error-inducing effects from soil background and atmospheric aerosols (Equation 3).

$$NDVI^* = \frac{NDVI_i - NDVI_0}{NDVI_S - NDVI_0} \quad \text{Equation 3}$$

Where $NDVI_i$ is the measured NDVI for the ith pixel, $NDVI_s$ is the saturated value for NDVI, and $NDVI_0$ is the NDVI value representing bare soil.

NDVI* is calibrated by measuring $NDVI_0$ for a field bare of vegetation cover or by using cumulative distribution functions for NDVI and hence, requires analysis of the scene for calibration with no specific ground target or ground-based measurements. NDVI* can be calculated from any EOS data, such as Landsat Thematic Mapper, that includes red and near infrared broad bands.

For comparison of EOS data across seasons, the effect of variable solar angles and distance to the sun are corrected through the calculation of reflectance with methods that are standardized and widely published. NDVI* functions as an approximation of at-ground NDVI and also corrects for the influence of the bare soil background that generally is above zero NDVI. Particularly during the early growing season, the exposed soil background may have a controlling relationship for the obtained NDVI values since the soil is completely or partially visible to the view from the EOS platform.

Since NDVI* represents a range of water use from zero to one, it is analogous to the distribution of ETr, that also ranges from zero to some energy-limited maximal value. NDVI* is used as a scalar value to adjust ETr to achieve first-order estimates of ETa. Such first order estimates are appropriate for many vegetation types as shown in papers by Groeneveld and Baugh (2007) and Groeneveld et al. (2007) that examine how to process the EOS data and then use it to make estimates of ETa.

NDVI* is an accurate surrogate for Kcb in Equation 1 because it is an expression of the degree of gas exchange that is occurring in the canopy. Chlorophyll is an expensive molecule for plants to manufacture metabolically and so, the canopy optimizes the chlorophyll it produces. During photosynthesis pores within the leaves open to enable gas exchange with the atmosphere, enabling the uptake of carbon dioxide and combination with water molecules split by energy using red light. Photosynthesis is moderated by chlorophyll and the resulting carbohydrate building blocks for plant tissue are a measure of crop productivity. When the pores of the leaves are open, water molecules also evaporate from the water-saturated tissues inside. Hence, chlorophyll, photosynthesis, gas exchange and water loss are directly linked and this linkage forms the basis for estimating crop water use within this embodiment of the invention.

Crops rely upon stored soil water between rainfall and irrigation events and this storage is the key for all rational irrigation control. Accurate estimation of crop water use enables irrigation to simply replace the water that the crop has extracted from the soil as the rational basis for scheduling irrigation.

SUMMARY OF THE INVENTION

In an embodiment of the present invention, a system is provided for managing agricultural irrigation of crops in a field or a region thereof based on forecasted crop water requirements and other factors comprising at least one irrigation sprinkler located on the field or region thereof and at least one irrigation controller for adjusting water delivery to crops in the agricultural field; the controller located on or near the agricultural field, at least one instrument package that yields data on soil water, irrigation, solar radiation and rainfall located on or near the agricultural field or region thereof in communication with the at least one controller, a computer system remotely located from the field, the computer system storing data from the most recent Earth observation satellite data, historical reference evapotranspiration, field boundary location data, and crop growth curve statistics; the computer system additionally transmits and receives data from the at least one controller including data from the instrument package; a first algorithm for initiating a first daily forecasted crop water usage for future periods for the field and its regions that is based upon initial crop conditions assessed by Earth observation satellite data, statistical growth curves for the crop growing in the field and historical statistics for weather, a second algorithm for later adjusting the forecasted crop water usage based upon an update of the crop canopy condition obtained from Earth observation satellite data, and actual weather, including rainfall and reference evapotranspiration for each period that has been completed, and a third algorithm for soil water accounting for the field and its regions by determining the water depleted through crop water use and water added through rainfall and irrigation with consideration of the starting water content of the soil; the second and third algorithms are processed at least daily during the crop growing season; a communication server for intercommunicating with said at least one controller to provide irrigation system control.

In an embodiment of the present invention, a method is provided for managing agricultural irrigation of crops in a field or a region thereof based on forecasted crop water requirements and other factors comprising the steps of: placing on or near the agricultural field at least one irrigation sprinkler located on the field or region thereof and at least one irrigation controller for adjusting water delivery to crops in the agricultural field, at least one instrument package gathering data on soil water, irrigation, solar radiation and rainfall on or near the agricultural field or region thereof and communicating the gathered data with the at least one controller; locating a computer system remotely from the field and in communication with the controller, gathering and storing data from the most recent Earth observation satellite data, historical reference evapotranspiration, field boundary location data, crop growth curve statistics, in said computer system and additionally receiving and storing data from said at least one controller; processing a first algorithm for initially forecasting daily crop water use for the field and its regions based upon initial crop conditions assessed by Earth observation satellite data, statistical growth curves for the crop growing in the field and historical statistics for weather, subsequently iteratively processing one or more additional algorithms for adjusting the initially forecasted crop water usage based upon an update of the crop canopy condition obtained from Earth observation satellite data, and actual weather, including rainfall and reference evapotranspiration for each day that is completed, and for water accounting for the field and its regions by determining water depletion through crop water use and addition of water through rainfall and irrigation, and intercommunicating with the at least one controller to provide irrigation system control that will maintain the crop. In another embodiment, the last described embodiment, computer algorithms, additionally includes data for the maximal rate of delivery by the at least one sprinkler, and creating soil water bank through the period of greatest soil water depletion and allow for the depletion of the remaining available soil water in the bank at the end of the growing season.

DETAILED DESCRIPTION

Figure 1:
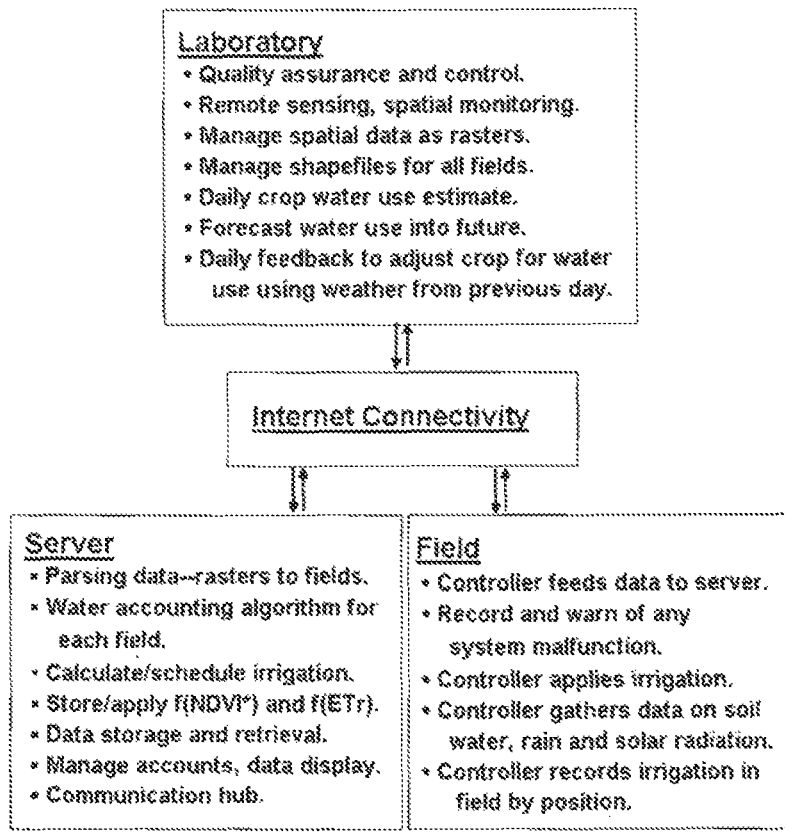
FIG. 1 is a schematic that shows the interrelationship in the embodiment of the invention of three groupings of functions and their linkage through the Internet: Laboratory, Server and Field.

As will be appreciated by one skilled in the art, aspects of the present embodiment of the invention are described in detail with reference to an example embodiment for application to center pivot systems. Though presented for center pivot systems, this invention is applicable to any system where irrigation control is desired at the field or subfield level and where the hardware exists to provide the water delivery.

The embodiment of the invention has been created for forecasting and prescribing irrigation for crops and to provide rational basis for delivery of irrigation prescriptions through remote controller technology that then meter the water onto the field. Such controllers are already in widespread use. In calculating and prescribing the irrigation to be delivered, this embodiment of the invention performs a water accounting algorithm to estimate existing soil water, depletion through crop water use, irrigation and rainfall. This water accounting algorithm provides forecasting ahead for the required levels of water delivery based upon statistical values of ETr from historic data. Such forecasts are updated periodically, and ideally each day after receiving the previous day's actual weather data, especially rainfall and ETr. Through the water accounting algorithm that is run throughout the growing season, this embodiment of the invention can offset irrigation when rain is received and to plan for, establish and maintain a soil water bank to augment shortfalls in irrigation rate during the mid-summer critical period when crop water use is maximal.

Estimates of quasi real-time actual crop water use (ETa) based upon the actual crop condition enables precise irrigation scheduling to meet crop water demand by scheduling irrigation to replace the water consumed by the crop from soil water storage. Precise irrigation conserves water and energy while reducing leaching of plant nutrients from the root zone that shorts the crop and can contaminate groundwater supplies. Such quasi-real time systems need to be: (a) sufficiently simple to provide robust and accurate output; (b) programmable so that the output can be automated; and (c) based upon digital remote sensing data so that the analysis covers large regions to assist many growers simultaneously. In this application, crop ETa is precisely equivalent to the water that is needed by the crop from the combined sum of rainfall and irrigation.

The Remotely-sensed Dual Coefficient (RDC) method was developed for estimation of ETa in this embodiment of the invention. RDC is based upon the dual crop coefficient method that is often used in agriculture to provide estimates of crop water use. RDC uses crop "greenness" as measured by NDVI* that is a measure of the chlorophyll in the canopy. Chlorophyll content determines photosynthetic capability, crop health, water use and yield. Crop greenness can be accurately measured using NDVI* from EOS data, a required step for this embodiment of the invention.

The RDC method is calibrated for each crop of interest by using NDVI* as an estimator of Kcb, the basal crop coefficient that estimates the water used by the canopy from the combined influence of interception and transpiration loss. After using NDVI* as an estimator of Kcb, statistical analysis is then performed to derive a correction that includes the effect of Ke in the calculation of ETa. The resulting form of the ETa estimator or is shown in Equation 4.

$$ETa = [f(K): \text{NDVI}^*]ETr \quad \text{Equation 4}$$

Equation 4 is an unbiased estimate of ETa that is, an unbiased estimator of actual crop water use. The estimated ETa is calculated using a function, $f(K)$, that is a fitted solution correcting the product of ETr and NDVI*. ETr is a spatially variable parameter.

Today's commercially-available EOS scenes cover areas of thousands of square miles with pixels that define the image resolution from meters to tens of meters. All calculations at the regional scale are accomplished using data rasters in which values vary spatially across regions. The pixel size is an important consideration because it determines the resolution at which a field can be evaluated. For example, with a pixel size of 30 m, Landsat Thematic Mapper, the most commonly used EOS platform, provides 4.5 pixels per acre within a field. The pixel is the smallest actual unit that can be evaluated for any field.

For Equation 4, NDVI* values in raster format are calculated for each pixel across the region of interest that are combined with other data that are also tracked on a per-pixel basis in raster format. ETr is another, raster-based variable that is calculated from discrete weather station data that includes solar radiation, wind, temperature and humidity. ETr is available from scattered weather stations across farmed regions and these spatially-explicit data must be interpolated continuously across the region for comparison to pixel by pixel data of NDVI*. This interpolation is made using geostatistical methods, for example "kriging", a technique that is commonly used in science and engineering. Geostatistical estimation provides continuously varying raster values across space as x (longitude) and y (latitude), that are analogous to a topographic map—for this analogy, the elevation component, z, is ETr. Geostatistical estimation is used for spatial extrapolation of measured ETr, and also for a suite of other variables necessary for irrigation accounting.

Calculations using raster math enable the use of Equation 4 with all calculations for crop water use made for each pixel. To provide the basis to track fields through time and provide the most accurate spatial information, an initial step is to resample all EOS pixel data so that it conforms to the same geographically-defined pixel grid at a set resolution.

This embodiment of the invention, including development of $f(K)$ that enables accurate, unbiased estimation of ETa from NDVI*, is an advancement appropriate for forecasting crop water requirements and prescribing irrigation as a replacement. The embodiment of the invention bases the ETa estimate on the remotely-sensed status of the crop and ETr derived from regional weather data. Such estimates provide a means to deliver the precise irrigation supply needed by the crop, thereby conserving water and energy and reducing leaching of soil nutrients caused by excess water percolating below the root zone. Precisely targeting the irrigation requirement provides the most profound conservation possible while achieving the desired yield from the irrigated crop.

The fitted function, $f(K)$, once calibrated for a given crop or suite of crops, does not vary with time of year or climate, and hence, is usable anywhere in the world that the crop or suite of crops is grown and irrigated. In raster calculations for crop water use, the measured parameters NDVI* and ETr vary in time and space. For the crop water supply side, rainfall also varies in time and space and is also tracked by geostatistical interpolation to form a raster from disjoint locations where measurements were made. In this embodiment of the invention calculations are made daily as rasters to track the relationship between soil water storage, augmentation of soil water storage through irrigation and rainfall, and depletions used by the crop as ETa.

Spatial datasets in raster form permit mathematical manipulation in few operations. Raster-based calculations offer great convenience because a pixel datum, for example NDVI* can be combined mathematically with a datum for the same pixel, for example ETr, stored within another raster, such calculations repeating for each pixel across thousands of square miles. Calculations in raster format provide output for many millions of pixels potentially over thousands of square miles.

Forecasting crop water demand requires knowledge of expected ETr through the summer. Expected ETr is based upon historical weather statistics. Hence, forecasting for ETa, uses a format as in Equation 4, but performed using expected values of ETr for the day of the year (DOY) for the desired period of the forecast. Over the region of interest, expected ETr values are stored as daily rasters of values that were interpolated from historical weather station data using geostatistical techniques. Such daily rasters are stored by DOY, for example June 1 is DOY 152.

For forecasting ETa of a crop grown in a farmed region that does not have wintertime pause, for example a subtropical climate, there would potentially be 365 individual $f(ETr)$ rasters representing all pixels across the region for each day of the year (leap year day ETr can conveniently be set to equal an adjacent day for simplicity).

The expected daily ETr rasters, designated, $f(ETr)$, are interpolated from the historic data by kriging to provide a distinct value for each pixel for each day across the region. ETa forecasted in this manner is the basis for estimating future irrigation with the most recent value of measured NDVI* for each pixel. Calibration for $f(ETr)$ is an operation that is a separate statistical analysis archived for use but updatable as more data become available. Periodic updates of ETr are a valuable way to anticipate the effect of climate change if it were to occur within the region of interest. A relationship for forecasting ETa is given in Equation 5, that substitutes $f(ETr)$ for measured ETr.

$$\text{Forecasted } ETa = [f(K):\text{NDVI}^*] \cdot f(ETr) \quad \text{Equation 5}$$

Where the forecasted ETa is calculated for all pixels as the product of $f(K)$-adjusted NDVI* and a raster of expected ETr values for the particular DOY of interest.

Equation 5 assumes that NDVI* was measured and is invariant and $f(K)$, as in Equation 4 is the mathematical operation that is calibrated for each particular crop so that ETr and NDVI* yield an accurate estimate of ETa. NDVI* is a dynamic value that increases as crop canopies grow and so, for forecasting ETa, NDVI* must also be forecasted ahead. The format of such forecasting is rendered highly accurate and robust when using NDVI* as the variable, because the forecast can be preconditioned by updated NDVI* values on a pixel by pixel basis.

ETa forecasting resulting from the combination of forecasted NDVI* and ETr provides a look ahead to schedule irrigation and estimate required irrigation magnitude. Scheduling in this context is simply optimizing the practical rate of delivery of the irrigation system versus the forecasted demand. The influence on crop water balance from increasing NDVI* as crops grow through each irrigation period is relatively small compared to the differences resulting from ETr. Actual ETr can be very different from the forecasted $f(ETr)$ based upon historic conditions, for example conditions of unusually hot, sunny and dry weather or conversely cool, wet and cloudy weather will yield under-prediction and over-prediction of ETa, respectively. Actual ETr controls ETa, the rate of water loss by the crop and so, daily accounting using the previous day's actual weather is the method for accommodating these differences. The forecast for irrigation is updated each day as the actual weather from the previous day is received.

For adequate operation of irrigation, forecasting is made for weeks into the future in order to schedule irrigation and manage soil water storage. For correcting ETa for actual conditions, after each day (for example, during early morning hours) and for each region being managed, an accounting program calculates the actual ETr for the net of stations across the region and then geostatistically interpolates ETr across the entire region. The NDVI* raster is then input to Equation 5 to calculate ETa. The raster of the forecasted ETa is replaced by ETa calculated from the updated ETr raster interpolated from the measured ETr of the previous day.

Like the calculations of ETr, NDVI* must also be forecasted during periods between clear EOS overpasses. The forecasted NDVI* values are designated $f(NDVI^*)$. Unlike $f(ETr)$ that is a geostatistically interpolated raster, $f(NDVI^*)$ are generated from curves of values through the growing season (Equation 6). Thus, each measured NDVI* update is used to precondition the forecasts NDVI* for each pixel. Forecasting NDVI* in this manner is robust because each crop will tend to develop at about the same rate each summer, though at any snapshot may be very different because the timing for crop initiation can vary widely, possibly by a month or more, and the effect upon NDVI* and ETa can be profound. An initial and an occasional update value of NDVI* are sufficient to accurately forecast NDVI* through the growing season for each and every pixel of interest.

$$ETa = [f(K):[f(NDVI^*)] \cdot f(ETr) \quad \text{Equation 6}$$

Where ETa is estimated entirely from a feed-forward function that is used when a measured NDVI* update for the day of interest is not available. The parameter $f(NDVI^*)$ is preconditioned by the last available NDVI*

The embodiment of the invention requires Equation 6 since updated NDVI* will generally be available only sporadically. Equation 6 provides accounting per pixel in each field or aggregated by averaging, for radial slices of the field or for field averages. The use of measured and interpolated ETr and NDVI* rasters corrects any tendency for mathematical drift of ETa over time so that irrigation application is targeted to deliver precisely what the crop needs rather than to simply be a simulation. Actual data best avoids systematic over-watering to conserve resources, or under-watering that would cause harm to the crop. During periods that NDVI* is unavailable or when the forecasted ETr differs from the actual, soil water storage will accommodate the differences between forecasted and actual conditions and the water accounting algorithm will record actual field conditions to correct the calculations into the future.

The embodiment of the invention encompasses three operational groupings to enable irrigation management. FIG. 1 defines these operational groupings and shows their interrelationship. The three operational groups—Laboratory, Server and Field—are interrelated through Internet connectivity that provides rapid communication among all three groups for data intake, processing and storage. Within the Laboratory, remote sensing and geographic information systems are used to forecast daily crop water use and to calculate corrections for actual weather conditions as they influence ETa and forecasting of irrigation. The Laboratory manages all spatial data as rasters that are then sent to the Server to be parsed to individual fields. In addition, since all data for forecasting ETa are acquired by the Laboratory, quality assurance and quality control is performed on the inputs.

The raster format of the data in the Laboratory, both as forecasts and corrected values, are calculated and uploaded to the Server each day for management of individual fields. Parsing of the raster data is accomplished in the Server through extraction of values from the regional data rasters using shapefiles. Shapefiles outline the fields of interest so that field-specific data, all tied to geospatial coordinates can be extracted from the raster files and parsed into fields and accounts that may manage from one to many fields. This delimits only the appropriate pixels for each field out of the vast array of pixels within each raster. Shapefiles are generated separately for each field and within the Laboratory and are uploaded to the Server initially or when changes in the shape and size of the fields or area cropped occur.

The Laboratory provides daily forecasts of ETa that are based upon geostatistically calibrated rasters of expected ETr, $f(ETr)$. ETa forecasts are made for a period into the future, for example three weeks (21 days) and these are updated with the data received from the previous day and uploaded to the Server that each day. The daily forecast mode as represented in Equation 6 enables the projection of the future amount of irrigation to be supplied. The daily rasters of ETa and the updated ETa using actual ETr as it becomes available for the previous day, enables the Server to more accurately account for the actual water used by a crop each day. During the night, 22 new rasters representing the rasters of the previous day's ETa calculated from rasters of actual ETr and the 21-day ETa projection are uploaded from the laboratory to the server. Note that the forecast period described here as 21 days will be adjusted for different climates, regions, and crops, however, for simplification it is held here for discussion as 21 days.

Daily updates of NDVI* or $f(NDVI^*)$, ETr or $f(ETr)$, and rainfall are all manipulated in raster format for the calculations within the Laboratory. The daily rasters of ETa from the previous day and the 21-day forecasted period parsed to individual fields are then evaluated by a water accounting algorithm in the Server. Accounting calculations are made for each field because irrigation must be tracked on a per-field basis. The water accounting algorithm calculates crop water balance as inputs (irrigation, and rainfall), outputs (ETa), and change in soil water storage—all preparatory for scheduling irrigation. The Server provides all calculations to forecast irrigation amount.

Soil water storage is calculated primarily through the water accounting algorithm, however, some fields within a region will be instrumented each season with soil water sensors to provide calibration data with which to check the water accounting algorithm. Soil water instrumentation is only needed for cross checking in simple cropping systems, for example deep-rooted corn on soils that are uniform over regions a robust system having a deep rooted crop that provides a large volume of soil for water storage. A higher density of soil water sensors would be called for if the crop is extremely shallow rooted, and the soil is highly variable. The use of soil water sensors is meant to provide cross checks and calibration for the water accounting algorithm rather than to be a primary instrument for decision making, although the algorithm can utilize measured soil water if desired.

The water accounting algorithm calculates the amount of soil water storage needed to supply deficits in irrigation capacity during the critical period that can occur in mid summer. Many and perhaps most of the center pivot systems in use have maximal rates or irrigation delivery that are less than the expected ETa of the crop when the crop canopy expression and ETr are greatest. The critical period arises from common limitations in well design and capability and from infrastructure that limits the rate of flow to the sprinklers. The water accounting algorithm calculates these limitations by summing the daily expected water shortfall through the critical period, taking into account the starting estimate of crop-available soil water content, the crop-specific $f(NDVI^*)$, and the $f(ETr)$ of Equation 6 for calculation of the demand, and the grower-specified maximum delivery rate for the sprinkler system when run continuously through the critical period for the supply. In advance of the critical period each year, irrigation is adjusted to deliver more water than the crop requires during the initial part of the growing season to build soil water storage forecasted for the crop water use during the critical period. The soil water storage is optimized for banking when the canopy is tall enough to shade the ground surface and provide aerodynamic resistance, factors that reduce evaporation. Also, preference is given for banking soil water during periods of cloudy or rainy weather when evaporative losses will be less.

Accounting calculations optimize the irrigation rate to be applied, based on forecasted crop water demand, rain received by the field following the last irrigation, the effect of recent weather patterns that may alter crop water demand and the need for sufficient storage to carry the crop through the critical period. The system is operated conservatively through the first half of the growing season to ensure a sufficient bank of stored soil water for the critical period, while the strategy during the second half of the growing season will be to reduce irrigation to deplete the soil water storage that may have accumulated as the result of summer storms that added soil water storage in excess of that needed through the remainder of the season. This occurs if irrigation shortages during the critical period did not materialize due to extended cool and rainy weather. To ensure that the crop uses the stored soil water, irrigation can be curtailed early to enable the bank of stored soil water to be depleted to the extent possible prior to harvest. In this way, the soil water within the crop root zone is depleted and available to be recharged through the winter period. This is a strategy that is effective in a temperate climate such as the Great Plains of the United States. In other climates other strategies are to be developed since all of the inputs necessary for such strategy selection will be gathered.

In addition to the water accounting algorithm, the Server also manages the feedback data received from the field that includes actual irrigation application and rainfall received by the field data—necessary for the water accounting algorithm.

The embodiment of the invention works for three scales of center pivot irrigation prescription and control. Since the method will be calculated for every pixel in a field, the finest scale will provide different irrigation prescription for each sprinkler in the field. The RDC method is applicable to each pixel and at this highest level of detail, permits prescription of variable rates of irrigation throughout the field to serve systems that are designed and manufactured to deliver such variable rates. The present embodiment of the invention is designed to work with these systems to deliver differential rates as the sprinkler sweeps around the field. Since the axil of the irrigation boom is a known point and a GPS provides positioning at the end of the boom, the location of each sprinkler in the field is known at all times as the irrigation boom transits around the field.

Though the data prescribing irrigation is generated per pixel, the pixel data can be aggregated to less detail by averaging when high resolution spatial prescriptions are not required. For example irrigation for an entire field are prescribed conveniently as a single average value for all pixels—a solution that is appropriate for many farmed locations where the soil and resulting crop variability across the fields are relatively low. Likewise, the pixel values in each field can be averaged for small wedges, analogous to pie slices, for example 3.6 degree slices yields 100 separate slices and water prescriptions. As an intermediate step between variable rate irrigation for each sprinkler and managing a field as a single average, such radial slices are aggregated from the individual pixel data to provide targeted prescriptions in each slice simply by speeding or slowing the pivot rotation while it irrigates continuously at the same rate.

For the water accounting algorithm, rainfall is an important contribution that is tracked at the finest scale available. The sensor package for managing the embodiment of the invention at the field will include a tipping bucket rain gage in most, and possibly all fields. If there is a high density of managed fields, tipping bucket rain gages may not be needed on every system and so, could be eliminated from some as a cost savings. The rainfall amounts will be provided as feedback from the field to the Laboratory for calculation of rasters of rainfall using geostatistical methods. The contribution of rain to the water balance of the system is a necessary variable because it can provide many days of crop water demand at full crop expression and help build soil water storage.

In addition to scheduling and managing irrigation events, the accounting system forwards all files of the ETa forecasts, rainfall updates, and accounting output to the Server archive for each field. Through the medium of the Internet the Server performs the task of interface to supply any desired data retrieval, data download, and data display for irrigation history and forecasts to provide the greatest utility to the grower.

The irrigation history for each field, combined with all other agronomic inputs, for example seeding and fertilization are stored on the server to enable data analysis to upgrade future agronomic decisions pertaining to cropping and its management within individual fields or over the entire farmed region. Thus, the embodiment of the invention permits storage and retrieval of data instrumental to enhance yield while conserving inputs to obtain it.

An example embodiment of this invention was developed for use with center pivot irrigation systems however, the embodiment of the invention is applicable to any irrigation system that has the potential for active control, whether as blocks of sprinklers or at the level of the individual sprinkler. Likewise, this embodiment of the invention is applicable for all manner of controlled delivery, whether through sprinklers, traveling tricklers (hoses that hang from a center pivot), or drip irrigation.

The flowcharts, FIGS. 2 through 6, provide a means to track the embodiment through the various steps, from obtaining EOS data and weather inputs to the control of irrigation in the field, and the accounting necessary for this irrigation control. The conventions used in FIGS. 2 through 6 are:

The subscript "j" refers to the jth day. The jth day for EOS data is the day of the overpass.

The subscript "i" refers to the ith pixel.

The subscript "n" refers to the nth crop.

A fitted mathematical function is referred to as "$f$" in $f(K)$, for the K function that takes the product of ETr and NDVI* from being a first order estimate of crop water use to then become an unbiased estimator of ETa. Other functions used are $f(ETr)$ that is a statistically-derived estimate of ETr that is interpolated using geostatistics for any location and any day, and $f(NDVI^*)$ that is a statistically derived estimate of NDVI* for a crop canopy that is preconditioned by prior measurements.

Figure 2:
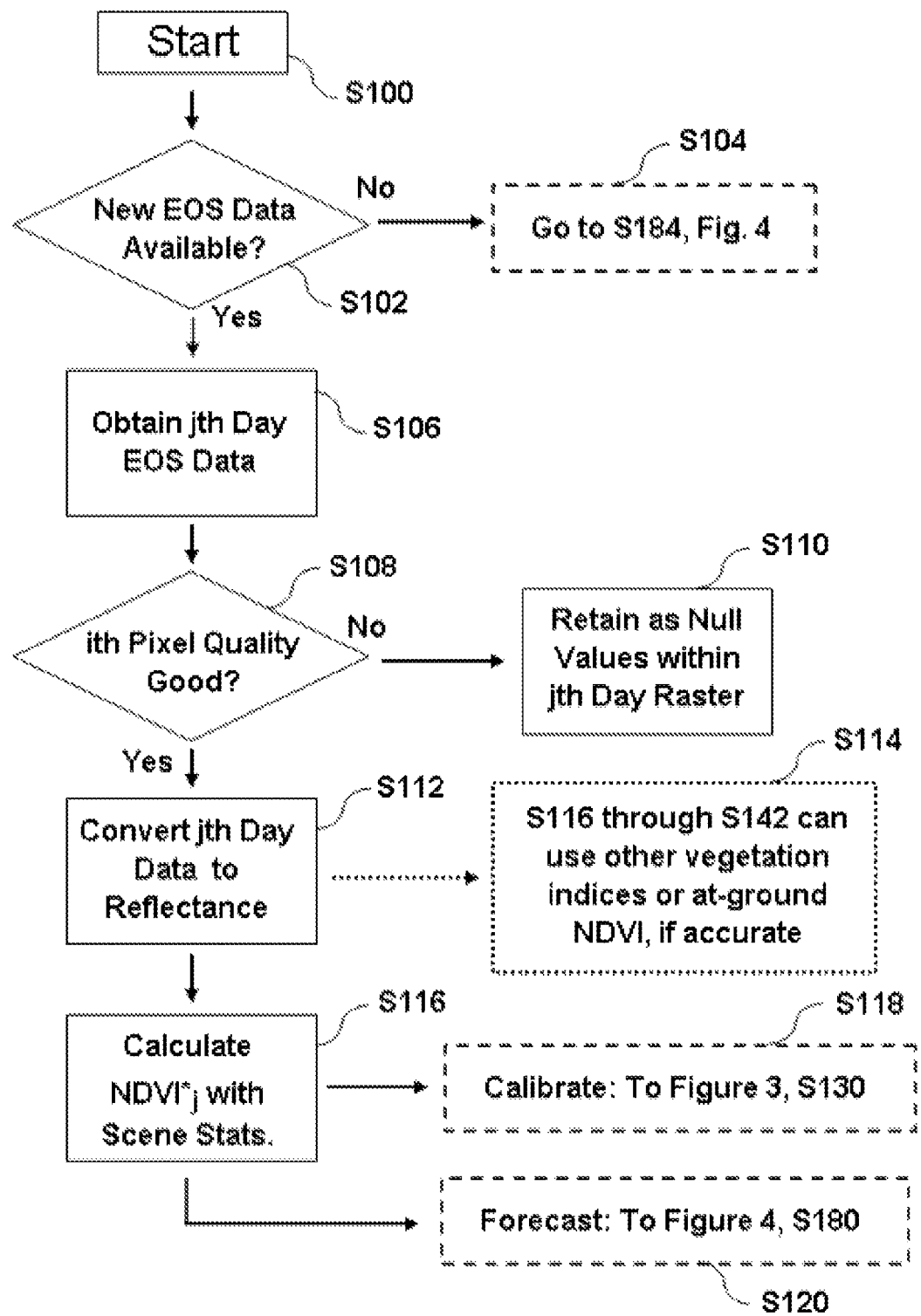
FIG. 2 is a flowchart for calculations regarding satellite data processing that are made within a raster format to correct EOS data for reflectance and to calculate NDVI* for output to calibration or for forecasting; the steps shown are all raster based, processed by the Laboratory, and updated as new data becomes available.

The process can begin on FIG. 2 at Start (S100) that proceeds to block S102 which queries whether new EOS data are available. A "no" at block S104 forwards to S184 of FIG. 4 that provides daily ƒ(NDVI*) preconditioned by the last available NDVI*. A "yes" initiates S106 to obtain the latest overpass that occurred on the jth day and passes to the query at S108 for whether the pixel data for the overpass are "good", meaning that they are not affected by clouds or smoke. If the answer is "no", data are not good, then these data are retained as null values within the raster field (S110) to pass to S184 to be filled with updated data for NDVI*. If the answer to the query is "yes", then the data are passed to block S112 that converts the data to reflectance. An alternate block S114 is a reminder that these calculations can be performed using other vegetation indices, including an at-ground NDVI (calibrated by correction of atmospheric issues) if such indices can be made to perform accurately. The calculations then pass to block S116 that calculates NDVI* using scene statistics and other sources. From S116, the NDVI* values pass to either S118 referring the flow to block S130 on FIG. 3 that provides for developing calibration relationships necessary for estimation of NDVI*, or to Block S120 in which the NDVI* are used for operational forecasting of ETa, starting at Block S180, FIG. 4.

Figure 3:
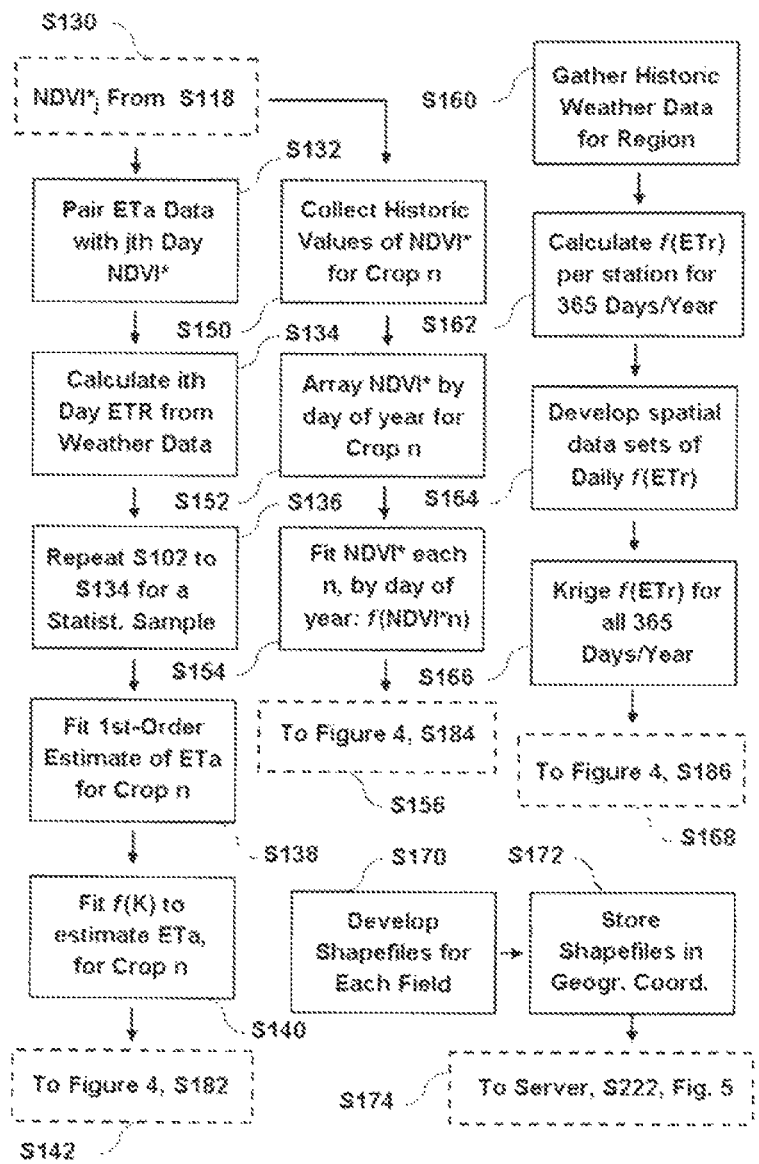
FIG. 3 is a flowchart that contains calibration steps for use in the present embodiment. These calculations are made in the Laboratory, are raster and vector based and are archived for later use calculating and forecasting ETa and extracting data for analysis at the field level; four individual calibration steps are shown.

From FIG. 2, the method passes to FIG. 3 that in its entirety represents the statistical calibration steps that enable calculation of crop water use, ETa. The calibration procedures on FIG. 3 are arranged in four groupings. The column on the left representing calibration of ƒ(K), that transforms ETr and NDVI* to produce an unbiased estimation of ETa.

Irrigation simply replaces that water that was used by the crop. The calculations start at S130 with the importation of NDVI* that corresponds with measured values of ETa and ETr from available data sets that are paired with NDVI* from EOS data for calibration. Such calibration data sets may be developed in support of this embodiment of the invention or may be adapted from data sets that are published and available through the Internet and supplied directly from researchers responding to requests.

FIG. 3, starting at block S130, imports NDVI* from the calculations made in FIG. 2. Passing to Block 132, the NDVI* from historic data are paired with measured ETa (the calibration data sets). Daily values of ETr are calculated from weather data in block S134. At block S136, data for NDVI* and measured values of ETa and weather data for the same location and date are collected, processed and added to the other pairs of data until a statistical sample is assembled. In block S138 a first order estimate of ETa, the product ETr and NDVI*, is made and compared to the measured ETa for each crop. Linear regression is then used in block S140 to fit an equation, ƒ(K), and to correct NDVI* to yield an unbiased estimate of ETa. Once calibrated, ƒ(K) is exported at S142 to the workflow in FIG. 4 at S182 that updates rasters of ETa.

For calibration of the embodiment function that allows forecasting of NDVI* from any pixel having a measured jth NDVI* starting value, the second column of FIG. 3, block S150, receives NDVI* from S130 for a raster that contains a known crop "n" in an exemplary field. A collection of these historic data are plotted by day of year in block S152 and a curve is fitted to the timewise NDVI* of the crop through the growing season. The resulting function ƒ(NDVI*n) calculated in block S154 are then be used as an estimator of the future condition of crop n in the pixel of interest that is based upon the most up-to-date value of NDVI* for that pixel. This forward look forecasts and fills daily values until the next successful (cloud free) and available EOS overpass. The estimator ƒ(NDVI*n) scales the forecasted values of NDVI* for the growth rates calibrated using crops of approximately average or better health. The calibrated relationship for ƒ(NDVI*n) is exported at S156 for application to forecast NDVI* and ETa to S184.

The pattern of sunlight, wind and temperature follow the same general trends each year for a region and determine the general seasonal magnitude of ETr. The third column of FIG. 3 provides for spatial and temporal calibration of expected ETr, ƒ(ETr), that are calibrated as daily rasters. An example embodiment of the steps required for this workflow are to first gather historic weather data for the region (S160), fit a statistically-derived function for each weather station (S162), that are then joined to form spatial data sets for analysis (S164) that are then interpolated using geostatistics (for example kriging) in S166 to develop the rasters of expected ETr that are exported S186 in FIG. 4 at block S168.

Calibration of ƒ(K), and ƒ(NDVI*n) is accomplished as statistical curves. Calibration for ƒ(Etr) is accomplished by deriving daily rasters for the entire growing season. The fourth calibration is simply the development of shapefiles (FIG. 3, S170) for each field that are labeled and stored by their geoposition (S172) and uploaded to the server (S174). Geographic coordinates provide an unambiguous label to call up all spatial aspects of a field, including its boundary, engineering aspects of its irrigation system, location of sampling points, etc., that can be stored in shapefiles and stored with field-specific data within the server. Shapefiles are electronic vectors that are be used to store information or to parse large rasters into individual fields.

Returning to FIG. 2, the alternate and intended use of NDVI* is to calculate or forecast crop water use, ETa. Block S120 refers to NDVI* values at S180 of FIG. 4.

Figure 4:
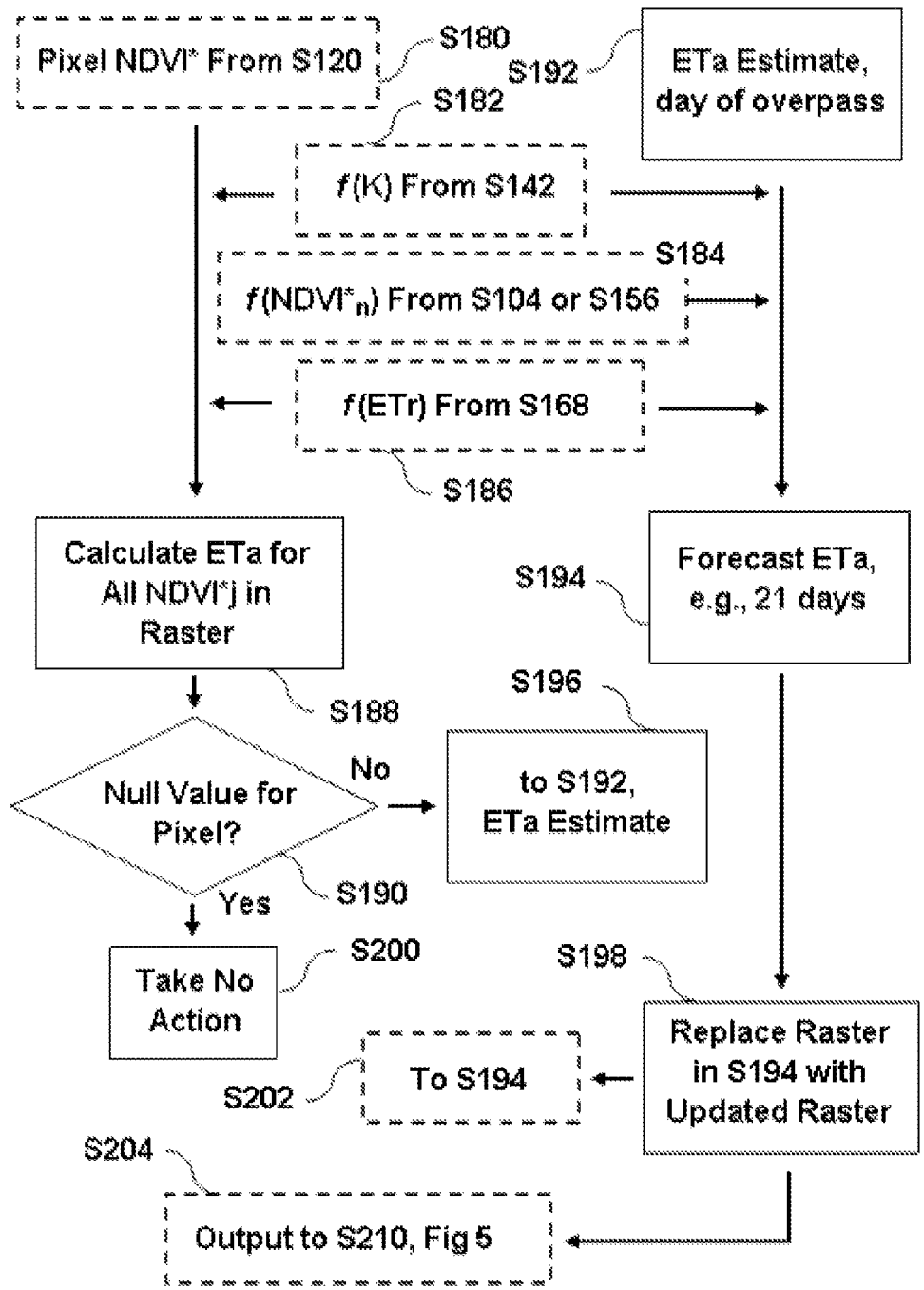
FIG. 4 is a flowchart of Laboratory functions for ETa calculations, both from measured inputs and from forecasted inputs. The left side of the chart provides the water accounting algorithm within the Server. The right side of the chart forecasts ETa based upon the last available NDVI* with the final steps updating the newly measured NDVI* pixels into the archived raster used to forecast future crop water demand.

Figure S180 of FIG. 4 then passes to S188 wherein ETa is calculated using ƒ(K) and ƒ(ETr) imported at S182 and S186 derived from calibration in FIG. 3. Query S190 then asks whether the value for an individual pixel is null or contains an updated NDVI*. An affirmation that the pixel is null (occluded by clouds or cloud shadows, or is subject to scan line failure or other technical problem) leads to block S200 and no action is taken. A "no", leads to S196 that replaces the non-null pixels in the raster for the jth Day.

The processing and addition of data to the jth Day ETa takes place as data become available, days to weeks between EOS overpasses and daily ETr updates. Forecasting of ETa takes place every day (S190) using input of ƒ(K), ƒ(NDVI*n), and ƒ(ETr) generated by calibration and imported at blocks S182, S184 and S186. Forecasts of ETa using these inputs and the estimate of NDVI* preconditioned by the most recent raster input of NDVI* are calculated into rasters forecasting future ETa at S194. The raster for the jth Day (day of overpass) is called in S196 and all non-null pixels are replaced with the updated NDVI* that then passes to S192 to formulate an ETa estimate. At S202, the raster is returned to S192. ETa is then re-forecasted at S194 for a future period. Commonly, there is a day to several days lapse between the jth Day and the delivery of the EOS data. FIG. 4, that develops rasters of ETa, closes with step S204 that exports the period of forecasted ETa rasters to the Server in FIG. 5.

Figure 5:
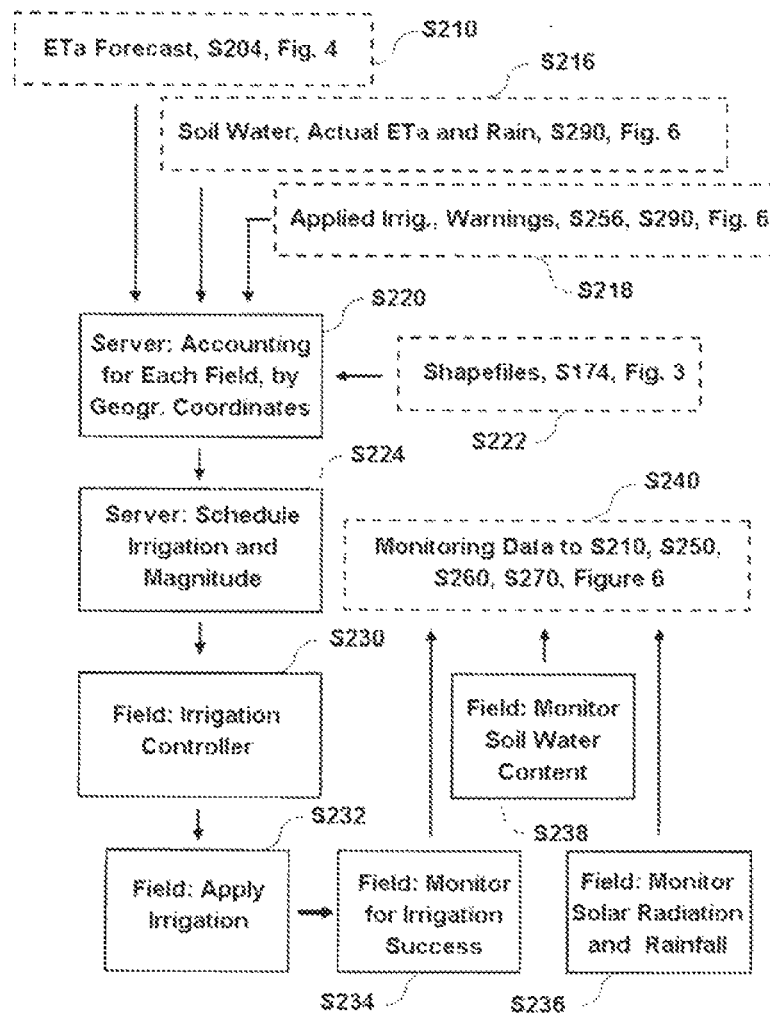
FIG. 5 is a flowchart that includes the Server and Field groupings that takes inputs of ETa forecasts, performs accounting and schedules irrigation events and magnitude; the lower half of the flowchart is the Field controller that applies the irrigation and provides monitoring feedback that is used to feed back to the water accounting algorithm and to data archives for the field.

FIG. 5 provides a general description of crop water accounting and irrigation control. The general steps within FIG. 5 start with the Server that provides accounting for each field, designated by the unique Geographic Coordinates of the field, and having an ETa, imported from the forecasting activities in FIG. 5 (S210). Crop water accounting also inputs daily rasters of actual ETr and rainfall used for adjustment of the crop water balance, from FIG. 6 (S216). Field warnings of inoperative irrigation or soil water deficits are also input at S218 received from accounting of the crop water balance (S220) that includes prescribing the magnitude and scheduling of an irrigation event (S224). These calculations require shapefile input from S222 regarding the datum for maximal irrigation application rate to be used for forecasting when to irrigate, at what rate, and for how long that is sent to the controller within the Field at S230.

Irrigation application is made at S232. Other field-level processes include monitoring of the application, for example flow rates of the irrigation, that occurs at block S234, passing information to S240 on FIG. 6 that provides background calculations relative to the monitoring data. An additional monitoring sensor provides daily input of soil water content measured at a representative location in the field (S238) and rainfall and solar radiation measured at the field (S236). Solar radiation is the major variable determining ETr values for the field of interest. Numerous solar radiation sensors can be used for achieving a net of data for high resolution ETr interpolation using geostatistics that passes to S186 of FIG. 4.

Figure 6:
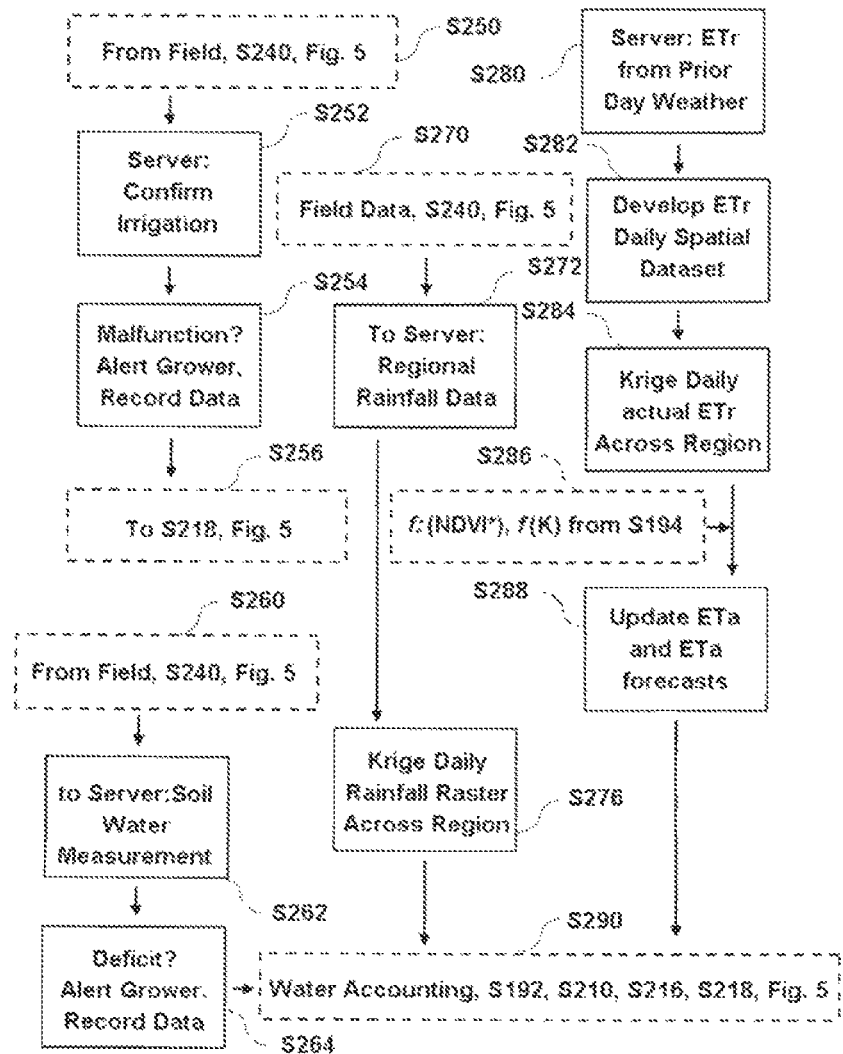
FIG. 6 is a flowchart of the basic monitoring data from the Field and tasks that are performed within the Server that output to the water accounting algorithm.

FIG. 6 provides an outline of a series of background calculations that provide feedback for the irrigation control program. At S250, data is received from the flow meter on the center pivot that detects a malfunction (S252), that alerts the grower at S254, and then passes the warning and other information to the data archive for that field (S256).

At S260 data are received from the field for soil water content (S262) that detects soil water deficit and alerts the grower at S264. These records are sent to archives for the field in S290. Another embodiment uses the measured soil water to calibrate the water accounting algorithm to enable accurate estimation of soil water storage simply through tracking of up-to-date irrigation, rain and ETa. Another embodiment is the inclusion of limited soil water monitoring for feedback and preconditioning of the accounting estimates on FIG. 5 (at S216) by providing direct estimates of soil water rather than water accounting algorithm estimates. Warning of deficit conditions is output to the grower and then to the archive for the field at S290.

Rainfall is an important addition to the field that reduces irrigation demand. Rainfall measured at the field or from kriged data within a region with a dense net of gages is input from collected field measurements at S270. Rainfall measured by the instrument packages in the fields within this embodiment, for example tipping bucket rain gages, are added to published weather station data in S272. Finally, the combination of all these rainfall inputs is kriged to develop a raster of the daily rainfall that is also uploaded to the server (S290). Other geostatistical methods than kriging can also be used.

The final piece of monitoring data is the update of the ETa values for the previous day through the inclusion of spatial calculation of measured ETr. This calculation occurs daily starting at block S280. The data received from weather stations is assembled as a spatial data set in S282 and then interpolated using geostatistics, for example kriging, in S284 in the Laboratory combined with $f(NDVI^*)$ and $f(K)$ at S286, to recalculate ETa at S288, and passing these calculations to S290.

Calculation made for daily updating of ETa are made during the night in the workflow of FIGS. 4, 5, and 6 after the data from the previous day are received and so that the control and feedback information is made available to each field for the next day. These data are passed among all three groupings, Laboratory, Server and Field during a period when the availability for internet bandwidth is enhanced because usership is generally low in the first hours of each day.

Various preferred and other embodiments of the invention have been described but it will be understood by those of ordinary skill in the art that modifications may be made without departing from the spirit and scope of the invention of the system and method. Accordingly, it is to be understood that the invention is not to be limited by the specific illustrated and described embodiments but only by the scope of the appended claims.

SCIENTIFIC REFERENCES

Baugh, W. M. and Groeneveld, D. P. 2006. Broadband vegetation index performance evaluated for a low-cover environment. *International Journal of Remote Sensing* 27:4715-4730.

Groeneveld, D. P. and Baugh, W. M. 2007. Correcting satellite data to detect vegetation signal for eco-hydrologic analyses. *Journal of Hydrology* 344:135-145.

Groeneveld, D. P., Baugh, W. M., Sanderson, J. S., and Cooper, D. J. 2007, Annual groundwater evapotranspiration mapped from single satellite scenes. *Journal of Hydrology* 344:146-156.

TUCKER, C. J., 1979, Red and photographic infrared linear combinations for monitoring vegetation. *Remote Sensing of Environment* 8:127-150.

I claim:

1. A system for managing agricultural irrigation of crops in a field or one or more regions thereof, the system comprising:
   at least one irrigation sprinkler located on the field or the one or more regions thereof;
   at least one irrigation controller configured to adjust water delivery by the at least one irrigation sprinkler to the crops, the at least one irrigation controller being located on or near the field or the one or more regions thereof;
   at least one instrument package configured to yield soil water data, irrigation data, solar radiation data and rainfall data, the at least one instrument package being located on or near the field or the one or more regions thereof and being configured to communicate with the at least one irrigation controller;
   a computer system located remotely from the field or the one or more regions thereof, the computer system:
   (i) being configured to store an Earth observation satellite dataset of the field or the one or more regions thereof, historical reference evapotranspiration (ETr) data of the field or the one or more regions thereof, field boundary location data of the field or the one or more regions thereof, and crop growth curve statistics data including crop growth curve statistics data for a crop type of the crops;
   (ii) being configured to at least one of (a) receive the soil water data, the irrigation data, the solar radiation data, and the rainfall data from the at least one irrigation controller or (b) transmit the soil water data, the irrigation data, the solar radiation data, and the rainfall data to the at least one irrigation controller;
   (iii) being operable to determine a daily forecasted crop water use of the crops for future periods of multiple days based upon an initial crop condition of the crops assessed by using at least one of Earth observation satellite data of the Earth observation satellite dataset expressed as NDVI* or the crop growth curve statistics data for the crop type of the crops expressed as NDVI*, a function to adjust NDVI* to be a scalar of ETr data of the field or the one or more regions thereof for unbiased estimation of actual crop water use (ETa)

data of the crops, and the historical ETr data of the field or the one or more regions thereof;
(iv) being operable to adjust at least daily the daily forecasted crop water use of the crops determined for at least one period of the future periods based upon at least one of updated Earth observation satellite data of the Earth observation satellite dataset for at least one day of the future periods expressed as NDVI* or the crop growth curve statistics data for the crop type of the crops expressed as NDVI*, the function to adjust NDVI* to be the scalar of the ETr data of the field or the one or more regions thereof for unbiased estimation of ETa of the crops, and actual weather data of the field or the one or more regions thereof, including actual rainfall and actual ETr for each period of the future periods that has been completed; and
(v) being configured to communicate with the at least one irrigation controller to instruct the at least one irrigation controller to adjust the water delivery by the at least one irrigation sprinkler to the crops based on the daily forecasted crop water use as determined and adjusted by the computer system.

2. The system of claim 1 wherein the computer system is further operable to determine an estimated soil water level of soil of the field or the one or more regions thereof by determining a water depletion level of the soil from crop water use of the crops based on the daily forecasted crop water use of the crops as determined and adjusted by the computer system and a water added level of the soil through rainfall and irrigation.

3. The system of claim 2 wherein the computer system accounts for a starting soil water level of the soil in order to determine the estimated soil water level of the soil.

4. The system of claim 3 wherein the computer system is further operable to determine the estimated soil water level of the soil to prescribe and schedule the water delivery by the at least one irrigation sprinkler to the crops to replace the daily forecasted crop water use of the crops as determined and adjusted by the computer system and to build up soil water in the soil in anticipation of any period of the future periods in which a rate of the crop water use by the crops exceeds a maximum rate of supply from the at least one irrigation sprinkler.

5. The system of claim 4 wherein the computer system is further operable to prescribe and schedule the water delivery by the at least one irrigation sprinkler to the crops to curtail the water delivery in advance of harvest of the crops in order to deplete the soil water in the soil within reach of roots of the crops.

6. The system of claim 1 wherein the crops include first crops at a first region of the one or more regions of the field and second crops at a second region of the one or more regions of the field, the first crops and the second crops having different water use requirements from each other.

7. The system of claim wherein:
the one or more regions comprise multiple regions of the field; and
the at least one irrigation sprinkler serves at least one region of the multiple regions of the field.

8. The system of claim 7 wherein the water delivery by the at least one irrigation sprinkler to the crops varies within a first region of the multiple regions of the field.

9. The system of claim 1 wherein the computer system is further operable to determine the daily forecasted crop water use of the crops based on empirically derived factors for a canopy of the crops.

10. The system of claim 9 wherein the canopy of the crops is assessed by a vegetation index that estimates canopy greenness.

11. The system of claim 10 wherein the vegetation index that estimates the canopy greenness comprises a is normalized difference vegetation index (NDVI) calculated from infrared and red bands of the canopy of the crops.

12. The system of claim 11 wherein the NDVI expressed as NDVI* comprises a normalized difference vegetation index for which zero is bare soil with no vegetation cover and unity is a surface saturated with peak vegetation cover and greenness.

13. The system of claim 12 wherein expressing the NDVI as NDVI* corrects for data scattering effects of soil background and atmospheric aerosols.

14. The system of claim 11 wherein the NDVI is based on Landsat Thematic Mapper data for a geographic area of interest including the field or the one or more regions thereof.

15. The system of claim 14 wherein the Landsat Thematic Mapper data is obtained by converting other data of at least one other Earth orbiting system to the Landsat Thematic Mapper data by linear regression analysis.

16. A method off managing agricultural irrigation of crops in a field or one or more regions thereof, the method comprising:
determining with a computer system a daily forecasted crop water use of the crops for future periods of multiple days based upon an initial crop condition of the crops assessed by using at least one of Earth observation satellite data of an Earth observation satellite dataset of the field or the one or more regions thereof expressed as NDVI* or crop growth curve statistics data for a crop type of the crops expressed as NDVI*, a function to adjust NDVI* to be a scalar of reference evapotranspiration (ETr) data of the field or the one or more regions thereof for unbiased estimation of actual crop water use (ETa) data of the crops, and historical ETr data of the field or the one or more regions thereof;
adjusting with the computer system, at least daily, the daily forecasted crop water use of the crops determined for at least one period of the future periods based upon at least one of updated Earth observation satellite data of the Earth observation satellite dataset for at least one day of the future periods expressed as NDVI* or the crop growth curve statistics data for the crop type of the crops expressed as NDVI*, the function to adjust NDVI* to be the scalar of the ETr data of the field or the one or more regions thereof for unbiased estimation of ETa of the crops, and actual weather data of the field or the one or more regions thereof, including actual rainfall and actual ETr for each period of the future periods that has been completed;
and
instructing with the computer system at least one irrigation controller to adjust water delivery by at least one irrigation sprinkler to the crops based on the daily forecasted crop water use as determined and adjusted by the computer system;
wherein:
the at least one irrigation sprinkler is located on the field or the one or more regions thereof;
the at least one irrigation controller is located on or near the field or the one or more regions thereof and is configured to communicate with at least one instrument package;
the at least one instrument package is configured to yield soil water data, irrigation data, solar radiation data and rainfall data and is located on or near the field or the one or more regions thereof;

the computer system is located remotely from the field or the one or more regions thereof and is configured to communicate with the at least one irrigation controller;

the computer system is configured to store the Earth observation satellite dataset of the field or the one or more regions thereof, the historical ETr data, field boundary location data of the field or the one or more regions thereof, and crop growth curve statistics data including the crop growth curve statistics data for the crop type of the crops; and the computer system is configured to at least one of (a) receive the soil water data, the irrigation data, the solar radiation data, and the rainfall data from the at least one irrigation controller or (b) transmit the soil water data, the irrigation data, the solar radiation data, and the rainfall data to the at least one irrigation controller.

17. The method of claim 16 further comprising determining with the computer system an estimated soil water level of soil of the field or the one or more regions thereof by determining a water depletion level of the soil from crop water use of the crops based on the daily forecasted crop water use of the crops as determined and adjusted by the computer system and a water added level of the soil through rainfall and irrigation.

18. The method of claim 17 wherein determining with the computer system the estimated soil water level of the soil of the field or the one or more regions further comprises accounting for a starting soil water level of the soil.

19. The method of claim 18 wherein instructing with the computer system the at least one irrigation controller to adjust the water delivery by the at least one irrigation sprinkler to the crops further comprises prescribing and scheduling the water delivery by the at least one irrigation sprinkler to the crops to replace the daily forecasted crop water use of the crops as determined and adjusted by the computer system and to build up soil water in the soil of the field in anticipation of any period of the future periods in which a rate of the crop water use by the crops exceeds a maximum rate of supply from the at least one irrigation sprinkler.

20. The method of claim 16 wherein instructing with the computer system the at least one irrigation controller to adjust the water delivery by the at least one irrigation sprinkler to the crops further comprises prescribing and scheduling the water delivery by the at least one irrigation sprinkler to the crops to curtail the water delivery in advance of harvest of the crops in order to deplete soil water in the soil of the field within reach of roots of the crops.

* * * * *